May 27, 1952  T. C. O'DONNELL  2,598,131
COMBINED CHECK VALVE AND STRAINER
Filed April 17, 1950
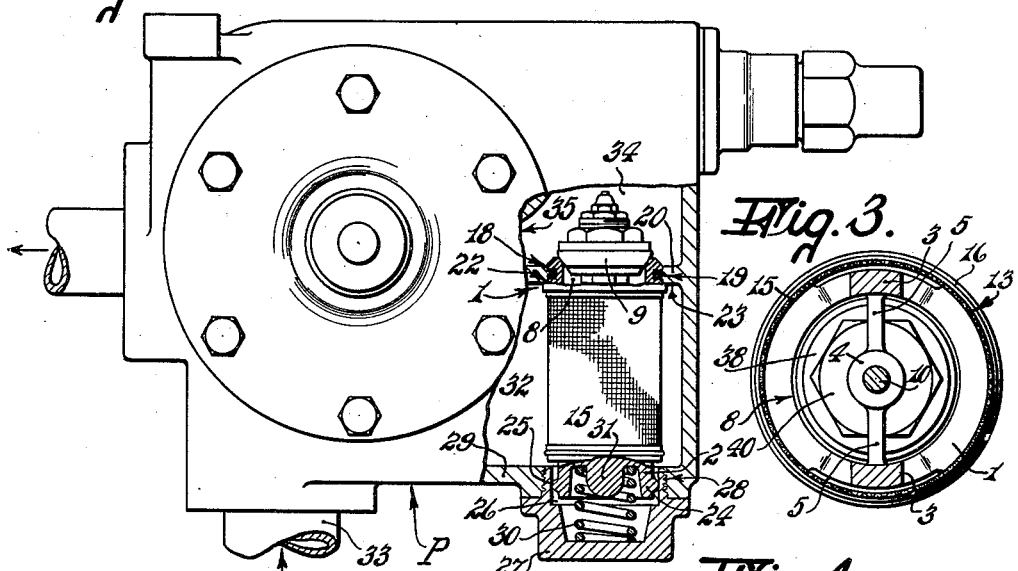
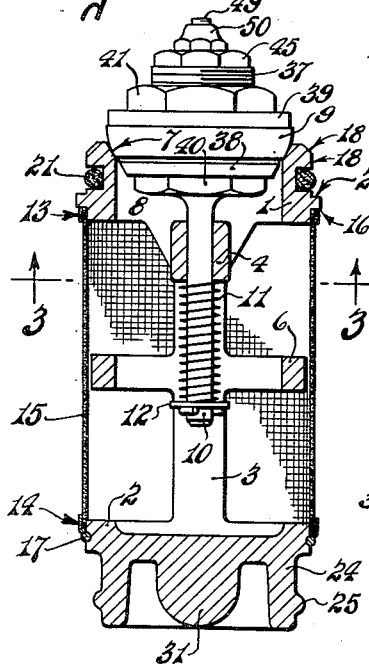
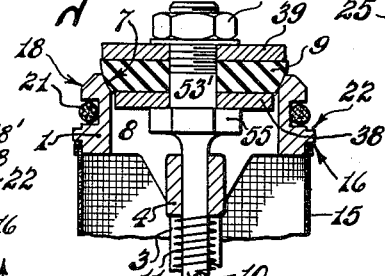
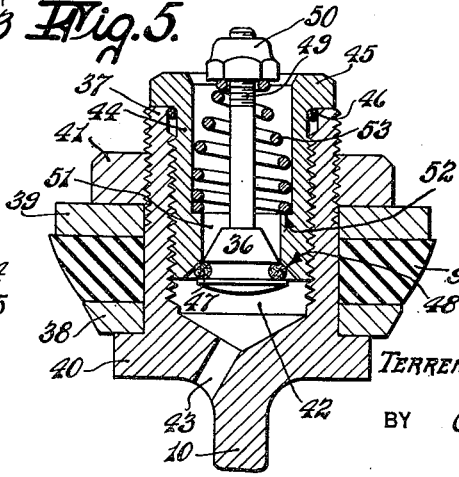
INVENTOR
TERRENCE C. O'DONNELL
BY Chapin & Neal
ATTORNEYS Patented May 27, 1952

2,598,131

UNITED STATES PATENT OFFICE 2,598,131

COMBINED CHECK VALVE AND STRAINER

Terrence C. O'Donnell, West Springfield, Mass., assignor to Gilbert & Barker Manufacturing Company, West Springfield, Mass., a corporation of Massachusetts Application April 17, 1950, Serial No. 156,424

3 Claims. (Cl. 210—166)

This invention relates to a combined valve and strainer unit for use in pumps, as for example, on the suction side of a pump for the purposes of preventing back flow of liquid and straining the liquid before it enters the pump.

The invention has for an object the provision of a unit of the type and for the purpose described, which may be easily removed from the pump when necessary and replaced by a similar new unit.

The invention also has for an object the provision of a replacement unit for pumps embodying a check-valve and strainer and also, if desired, a relief valve for relieving excess presure from expansion of the liquid.

The invention has for another object the provision of a combined valve and strainer unit having generally simplified and improved construction.

The invention will be disclosed with reference to the accompanying drawings, in which:

Fig. 1 is an elevational view of a pump with parts in section and showing the combined valve and strainer unit applied thereto;

Fig. 2 is a sectional elevational view drawn to a larger scale of the valve and strainer unit;

Fig. 3 is a sectional plan view taken on the line 3—3 of Fig. 2;

Fig. 4 is a bottom plan view of the unit;

Fig. 5 is an enlarged fragmentary sectional elevational view showing in detail the construction of the check valve with a relief or back-flow valve therein; and Fig. 6 is a fragmentary sectional elevational view showing another form of valve.

Referring to these drawings and first to Fig. 2 thereof, the device includes a frame which consists of an annular ring 1, a disc-like member 2, coaxial with and axially-spaced from ring 1 and a plurality of bars 3 (two as shown), which rigidly connect the ring and member near their outer peripheral portions. A bearing 4, forming a valve-stem guide, is located coaxially of the ring and member and is rigidly supported by spider arms 5 (Fig. 3) from the bars 3, just below ring 1. The frame may, and desirably does, further include an annular ring 6 (Fig. 2) coaxial with the ring 1 and member 2 and integrally connected to the bars 3, intermediate the ends thereof, for a purpose to be described.

The annular ring 1 has a valve seat 7, embordering the axial opening 8 therethrough and adapted to be engaged by a poppet valve 9, having a stem 10, slidably mounted in the guide 4. A spring 11, surrounding stem 10 acts between the lower end face of guide 4 and a suitable abutment 12 on the stem to hold the valve 9 to its seat.

The ring 1 and member 2 have coaxial cylindrical portions 13 and 14, respectively, forming seats to receive and closely fit the ends of a tubular screen 15. One end of this screen abuts an annular shoulder 16 on ring 1. A snap ring 17, mounted in a groove in the surface 14 of member 2, engages the opposite end of screen 15 and holds its against any substantial axial displacement. The described ring 6 provides desirable support for screen 15 at a location intermediate its end supports.

The ring 1 has an external cylindrical surface 18 which is adapted, as shown in Fig. 1, to fit in the cylindrical opening in an inner or partition wall of a pump, such as the opening 19 in wall 20. This surface 18 has therein a circumferential groove to receive a suitable packing ring 21, which tightly presses against the peripheral wall of opening 19 to seal the joint between it and the surface 18. The ring 1 further has an annular shoulder 22, which projects beyond the surface 18 and is adapted to tightly seat against the outer face 23 of wall 20. The outer end of surface 18 is preferably bevelled as at 18'.

The member 2 has an annular, tubular part 24 projecting away from the screen 15. This cylindrical outer periphery of part 24 has, intermediate its ends, an encompassing ring-like projection 25 of semi-circular cross sectional shape. This projection is adapted to fit with line contact only in a cylindrical opening 26 in a cap nut 27. The latter is exteriorly threaded to screw into an interiorly threaded opening 28 in an outer wall 29 of the pump, closing such opening. Within the nut is a coil spring 30 which extends into the opening in part 24 and presses upwardly on the member 2 in order to force the shoulder 22 against the face 23 of wall 20. Projecting centrally from member 2 into the tubular part 24 is a projection 31 which has two parallel sides (Fig. 4), which may be grasped by a pair of pliers for extraction purposes as will later appear and is wide enough to fit into spring 30 and roughly center the same.

There is shown in Fig. 1 a rotary pump P which has an inlet chamber 32, adapted for connection to the suction pipe 33 and a second chamber 34—having as its outlet the inlet port 35 of the pump chamber. The screen 15 spans the inlet chamber 32. Liquid from the latter passes radially through the screen and thence upwardly through the upwardly-opening check valve 9 into chamber 34 and thus to the inlet port 35 of the pump.

The valve 9 (Fig. 5) may contain within it, a relief valve opening in a direction opposite to valve 9 in order to relieve undue pressure, such for example as might be caused by expansion of liquid in the delivery line of the pump. This relief valve is shown at 36. The valve stem 10 has at one end a stud 37 to pass through the valve member 9 and the washers 38 and 39 applied to opposite faces thereof. One end of this stud has a hexagonal head 40 and the other end is threaded to receive a nut 41 by means of which the member 9 and its washers 38 and 39 are clamped between the head 40 and nut. The stud 37 has a coaxial and internally-threaded opening 42 therein, extending from its outer end inwardly toward but terminating short of head 40. A small passage 43 extends through head 40, obliquely to the axis of stem 10, and connects the inner end of opening 42 to the space below head 40. The relief valve is mounted in a hollow stud 44, which is threaded into hole 42 and which has at its outer end a hexagonal head 45 to seat against the outer end of stud 37. A rubber-like O-ring packing 46 seals the joint between the two hollow studs. The valve 36 has a rubber-like O-ring 47 to engage a seat 48 on the inner end of stud 40 and a stem 49 which extends outwardly through the opening in stud 44 and has a threaded end to receive a nut 50. The opening 51 in bushing 44 has, at a location intermediate its ends, a shoulder 52. A conical coil spring 53 acts between this shoulder and nut 50 to hold valve 36 on its seat 48. On an excessive rise in pressure in chamber 34 valve 36 will open and allow liquid to flow from opening 51 into opening 42 and passage 43 into chamber 32 of the pump.

If the relief valve 36 is not needed, the stud 44, which carries it, can be removed, and the opening 42 closed at its outer end by a suitable plug. Or the construction can be as shown in Fig. 6, where a smaller and solid stud 53' passes through the valve 9 and its washers 38 and 39 and carries a nut 54 for clamping the valve and its washers against a head 55 on the stud.

In applying the unit to a pump, the spring 30 is placed in cap nut 27 and the lower end of the tubular extension 24 of the frame is pushed into the opening 26 in the nut, the spring being centered by the projection 31. The rib 25 will fit the opening near the upper end thereof so that the valve and strainer unit, the nut and spring will be held together. The unit is thrust inwardly through hole 28 and the forward beveled edge of ring 1 serves as a pilot to facilitate the entrance of ring 1 into hole 19. The nut 27 will be turned to thrust the screen and valve unit upwardly until the part 18 is in place in hole 19 and the shoulder 22 abuts the face 23 of partition 20. The nut then turns without turning the valve and strainer unit because there is only the contact along rib 25 between the member 24 and nut. Thus, the nut can be tightened to compress spring 30 and finally seat on the outer wall 29 without rotating the valve and a strainer unit and causing wear on the packing 21.

Whenever the unit needs replacing, the nut is unscrewed and the unit is drawn out of the pump. The unit will usually not follow the nut, so that the nut will be removed with spring 30 leaving the unit in place. However, the flat-sided projection 31 is exposed and may be grasped by a pair of pliers to pull out the unit. A new unit is placed in the nut and assembled in the pump as above described.

What is claimed is:

1. A combined valve and strainer unit, comprising, a frame consisting of an annular ring having at one end thereof a valve seat surrounding the opening therethrough, a coaxial disc-like member axially spaced from said ring, a plurality of bars rigidly interconnecting the ring and member at angularly spaced locations about their outer peripheries, a valve-stem guide located adjacent the other end of said ring in coaxial relation therewith and between the valve seat and member, and spider arms rigidly interconnecting the guide and bars, said ring having two exterior cylindrical portions separated by a flange having axially-spaced annular shoulders located in planes normal to the axis of the ring, one said portion forming a plug adapted to fit in an opening and having a circumferential groove, a packing ring in said groove, the other cylindrical portion forming a screen seat, said member having an exterior cylindrical screen seat portion, a screen mounted at its ends one in each of said screen seats and spanning the space between the ring and member, a poppet valve engaging the valve seat on said ring and having its stem slidably mounted in said guide, an abutment on said stem between the guide and member, and a spring on the stem acting between one end face of said guide and said abutment to hold the valve to its seat.

2. A combined check-valve relief-valve and strainer unit, comprising, a frame consisting of an annular ring having at one end thereof a valve seat surrounding the opening therethrough, a coaxial disc-like member axially spaced from said ring, a plurality of bars rigidly interconnecting the ring and member at angularly spaced locations about their outer peripheries, a valve-stem guide located adjacent the other end of said ring in coaxial relation therewith, and spider arms rigidly interconnecting the guide and bars, said ring having two exterior cylindrical portions separated by a flange having axially-spaced annular shoulders located in planes normal to the axis of the ring, one said portion forming a plug adapted to fit in an opening and having a circumferential groove, a packing ring in said groove, the other cylindrical portion forming a screen seat, said member having an exterior cylindrical screen seat portion, a screen mounted at its ends one in each of said screen seats and spanning the space between the ring and member, a poppet valve engaging the valve seat on said ring and having its stem slidably mounted in said guide, an abutment on said stem, a spring on the stem acting between one end face of said guide and said abutment to hold the valve to its seat, said valve having therethrough a passage interconnecting opposite faces thereof, a relief valve mounted in the first-named valve and normally closing such passage, and a spring tending to hold the relief valve closed and yieldable to enable it to open in a direction opposite to that in which the first-named valve opens.

3. The combination in a pump casing, wherein two chambers are separated by an internal partition having a cylindrical opening therethrough, and an outer wall forms a wall of one such chamber and has therethrough a screw threaded opening coaxial with the first-named opening, a combined check-valve and strainer unit spanning the last-named chamber and supported from said wall and partition, said unit including a frame consisting of an annular ring having an outer peripheral surface to fit the first-named opening and a flange projecting beyond such surface to seat against said partition, a coaxial disc-like member, and at least one bar rigidly interconnecting the ring and member near their outer peripheral portions, a nut threaded into and closing the opening in said outer wall, a spring acting between the inner face of the nut and the adjacent end face of said member to press the frame toward the partition and seat said flange against said partition, said ring and member having coaxial cylindrical seats one on each, a screen having its ends mounted one on each said seat and spanning the space between the ring and member, said ring having a valve seat at its outer end surrounding the opening therethrough, a valve-stem guide located adjacent the inner end of the ring and between the valve seat and said member and fixed to the ring in coaxial relation, a poppet valve to engage said seat and having a stem mounted in said guide, and a spring on said stem for holding the valve to its seat.

TERRENCE C. O'DONNELL.

REFERENCES CITED

The following references are of record in the file of this patent:

UNITED STATES PATENTS

| Number | Name | Date |
|---|---|---|
| 1,847,068 | Campbell | Mar. 1, 1932 |
| 2,134,413 | Munoz | Oct. 25, 1938 |
| 2,352,315 | Gilbert | June 27, 1944 |
| 2,512,877 | Rike | June 27, 1950 |